United States Patent
Balmori Labra et al.

(10) Patent No.: US 9,760,255 B2
(45) Date of Patent: Sep. 12, 2017

(54) PROPAGATING THEMING INFORMATION FROM HOST APPLICATIONS TO HOST EXTENSIONS

(71) Applicant: Microsoft Technology Licensing, LLC, Redmond, WA (US)

(72) Inventors: Juan Gabriel Balmori Labra, Redmond, WA (US); Rajanikanth Naduppalayam Thandavan, Bothell, WA (US); Jiajun Hua, Redmond, WA (US); Daniel Mark Saunders, Bellevue, WA (US); Amit Mohindra, San Francisco, CA (US); Andrew Salamatov, Seattle, WA (US); Humberto Lezama Guadarrama, Redmond, WA (US); Runzhen Huang, San Jose, CA (US); Rennan Garrett Broussard, Palo Alto, CA (US); Peter Gene Wu, Cupertino, CA (US); Gabriel Royer, Redmond, WA (US); Michael J. Saunders, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 547 days.

(21) Appl. No.: 14/266,436

(22) Filed: Apr. 30, 2014

(65) Prior Publication Data
US 2015/0242080 A1    Aug. 27, 2015

Related U.S. Application Data

(60) Provisional application No. 61/943,927, filed on Feb. 24, 2014.

(51) Int. Cl.
G06F 3/0481    (2013.01)
G06F 3/0482    (2013.01)
(Continued)

(52) U.S. Cl.
CPC .......... *G06F 3/0484* (2013.01); *G06F 9/4443* (2013.01); *H04L 67/025* (2013.01)

(58) Field of Classification Search
None
See application file for complete search history.

(56) References Cited

U.S. PATENT DOCUMENTS

| 7,028,262 B2 | 4/2006 | Estrada et al. |
| 8,010,970 B2 | 8/2011 | Birov et al. |

(Continued)

FOREIGN PATENT DOCUMENTS

EP    2562640 A1    2/2013

OTHER PUBLICATIONS

International Search Report and Written Opinion from PCT Application Serial No. PCT/US2015/016725; mailed Apr. 23, 2015; 13 pages.

(Continued)

*Primary Examiner* — Mahelet Shiberou
(74) *Attorney, Agent, or Firm* — Schwegman Lundberg & Woessner, P.A.

(57) ABSTRACT

Mechanisms are described herein for propagating a theme definition from a host application to a host extension so that the host application and the host extension are visually consistent. A theme definition may be updated after a theme change event occurs as a result of a user interacting with the host application. The theme definition may then be utilized by the host extension to update one or more UI elements presented by the host extension to enable visual consistency.

20 Claims, 8 Drawing Sheets

(51) Int. Cl.
*G06F 3/0484* (2013.01)
*H04L 29/08* (2006.01)
*G06F 9/44* (2006.01)

(56) References Cited

U.S. PATENT DOCUMENTS

| | | | |
|---|---|---|---|
| 8,020,103 B2 | 9/2011 | Fried et al. | |
| 8,225,234 B2 | 7/2012 | Olander et al. | |
| 8,543,931 B2 | 9/2013 | Forstall et al. | |
| 2002/0039101 A1* | 4/2002 | Fernandez | G06F 9/4443 345/581 |
| 2005/0156939 A1* | 7/2005 | Fernandez | G06F 9/4443 345/581 |
| 2006/0015804 A1* | 1/2006 | Barton | G06F 17/246 715/213 |
| 2006/0206836 A1* | 9/2006 | Wessling | G06F 9/4443 715/810 |
| 2006/0230105 A1 | 10/2006 | Shappir et al. | |
| 2007/0028167 A1 | 2/2007 | Spada | |
| 2011/0010244 A1* | 1/2011 | Hatridge | G06Q 30/00 705/14.53 |
| 2011/0119684 A1 | 5/2011 | Suggs et al. | |
| 2012/0011447 A1* | 1/2012 | Bennett | G06F 9/4443 715/745 |
| 2012/0254731 A1 | 10/2012 | Peters et al. | |
| 2013/0031468 A1 | 1/2013 | Lee et al. | |
| 2015/0193388 A1* | 7/2015 | Cornet | G06F 17/227 715/235 |

OTHER PUBLICATIONS

"International Preliminary Report on Patentability Issued in PCT Application No. PCT/US2015/016725", Mailed Date: Mar. 7, 2016, 11 Pages.
PCT Written Opinion of the International Preliminary Examining Authority for PCT application No. PCT/US2015/016725, mailed Oct. 6, 2015, 11 pages.
"Customizing the Appearance Using Styles and Skins", Published on: Jan. 12, 2012, Oracle Fusion Middleware Web User Interface Developer's Guide for Oracle Application Development Framework 11G Release 1 (11.1.1.3.0), Part No. B31973-05, Available at: http://docs.oracle.com/cd/E14571_01/web.1111/b31973/af_skin.htm, 18 pp.

* cited by examiner

PROPAGATING THEMING INFORMATION FROM HOST APPLICATIONS TO HOST EXTENSIONS

CROSS-REFERENCE TO RELATED APPLICATION(S)

This application claims the benefit of U.S. Provisional Patent Application Ser. No. 61/943,927 filed on Feb. 24, 2014, entitled "PROPAGATING THEMING INFORMATION FROM HOST APPLICATIONS TO HOST EXTENSIONS," the entirety of which is expressly incorporated herein by reference.

BACKGROUND

Various types of software applications provide functionality for allowing the use of themes. For example, a presentation application may allow a user to select a theme. In response to the selection of a theme, the presentation application may alter user interface ("UI") elements based upon the selected theme. The UI elements may include, for instance, backgrounds, foregrounds, fonts, and other types of UI elements. The altered UI elements might include UI elements displayed by the presentation application and/or elements within a document opened for editing by the presentation application. The presentation application might also allow a user to change the theme in different ways, including the creation of custom themes.

Some applications (referred to herein as "host applications") might also allow the utilization of extensions (referred to herein as "host extensions") that extend the functionality of the application in some way. For example, a word processing application might utilize a dictionary extension to allow users to find a definition of a selected word. Host extensions might also provide their own UI elements and/or modify content contained in documents opened for editing in the host application. Additionally, host extensions might be part of the content of the document. Changes to themes made within a host application do not, however, propagate to host extensions and, as a result, the UI presented by host extensions and/or changes made to a document may be visually inconsistent with the UI presented by the host application.

It is with respect to these and other considerations that the disclosure made herein is presented.

SUMMARY

Concepts and technologies are described herein for propagating theming information from a host application to a host extension. In order to enable this functionality, a theme definition may be updated after a theme change event occurs. The theme definition may contain a default theme. When the default theme is updated, then the theme definition may also be updated. An example of a theme change event may be a user changing the theme of a document. Additionally, the theme definition may be utilized by the host extension to update one or more UI elements presented by the host extension. In this way, the UI and other elements presented by the host extension can be visually consistent with the UI and other elements presented by the host application.

According to one aspect presented herein, a computer-implemented method is provided for propagating theme change events from a host application to a host extension. In one implementation, the method includes providing a theme definition from the host application to the host extension. The host extension may utilize the theme definition to update one or more UI elements presented by the host extension. The method may also include detecting a theme change event by way of the host application. In response to detecting the theme change event, the method updates the theme definition based upon the theme change event to create an updated theme definition. Additionally, in response to detecting the theme change event, the method provides a notification of the theme change event from the host application to the host extension. The host extension may then utilize the updated theme definition to update one or more UI elements presented by the host extension.

According to another aspect, a computer-readable storage medium has computer-executable instructions which, when executed by a computer, cause the computer to provide a theme definition from a host application to a host extension. The host extension utilizes the theme definition to update one or more UI elements presented by the host extension. After detecting a theme change event, the host application updates the theme definition based upon the theme change event to create an updated theme definition. Additionally, the host application provides a notification of the theme change event to the host extension in response to detecting the theme change event. The host extension utilizes the updated theme definition to update the one or more UI elements presented by the host extension.

According to yet another aspect, an apparatus is provided for propagating theme change events from a host application to a host extension. The apparatus includes a processor and a memory coupled to the processor storing the host application. The host application executes in the processor from the memory. The apparatus provides a theme definition comprising an application level theme and a document level theme to the host extension. The application level theme defines a theme for UI elements provided by the host application. The document level theme defines a theme for UI elements provided by a document from the host application. The host extension utilizes the theme definition to update one or more UI elements presented by the host extension.

The apparatus can also detect a theme change event. In response to detecting to the theme change event, the apparatus updates the theme definition based upon the theme change event to create an updated theme definition. The apparatus also provides a notification of the theme change event to the host extension from the host application. The host extension utilizes the updated theme definition to update the one or more UI elements presented by the host extension to make the one or more UI elements presented by the host extension look consistent with the host application and the document.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter.

Furthermore, the claimed subject matter is not limited to implementations that solve any or all disadvantages noted in any part of this disclosure.

DETAILED DESCRIPTION

Figure 1:
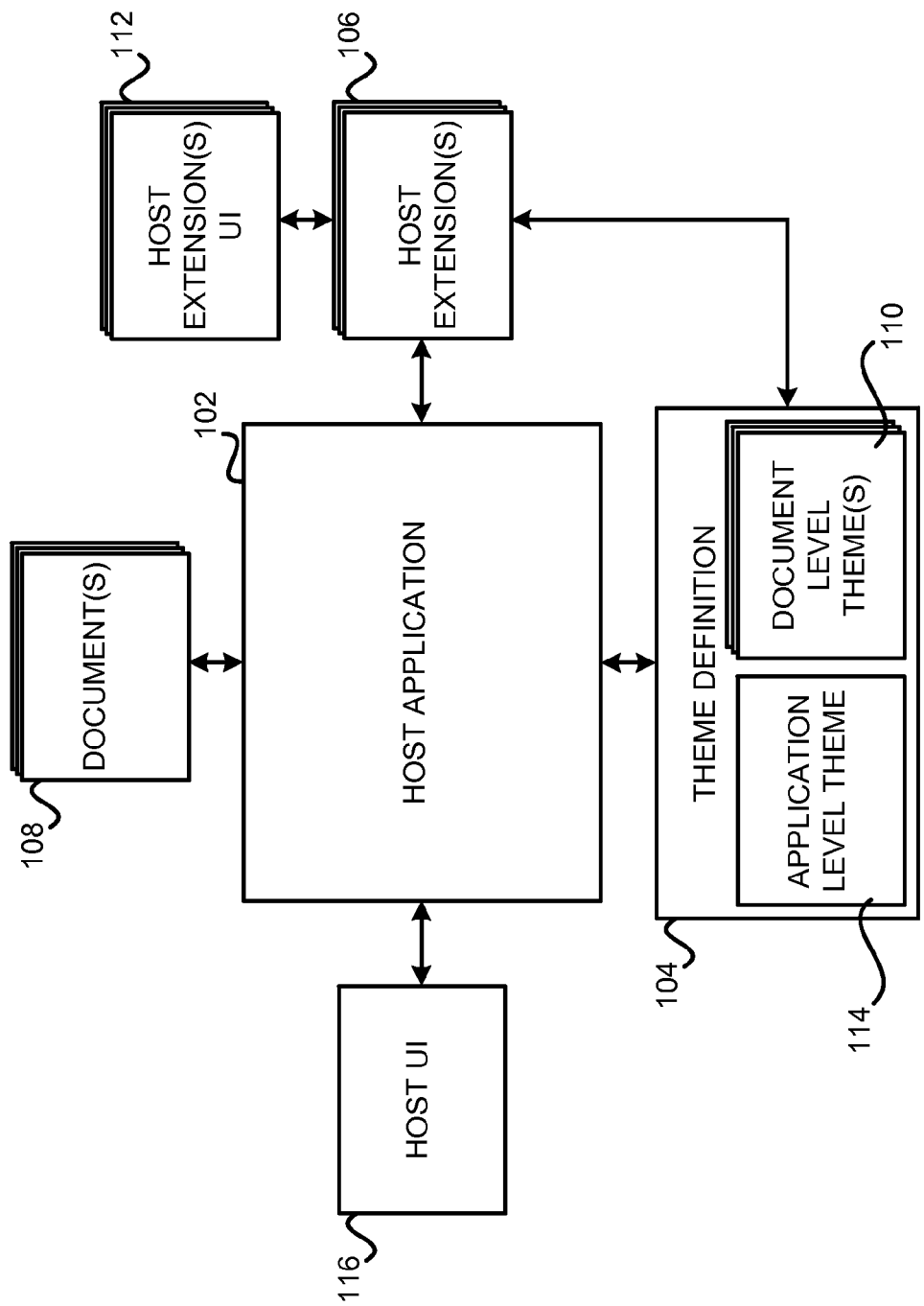
FIG. 1 is a block diagram providing an overview of aspects of the embodiments presented herein.

The following detailed description is directed to concepts and technologies for propagating theming information from a host application to one or more host extensions. As mentioned briefly above, a host application may present UI elements in a manner that is defined by a theme definition. The theme definition may also define UI elements presented by a document being run by the host application. Similarly, one or more host extensions configured for use with the host application might also present various UI elements. The host application is configured to propagate a theme definition to the host extensions. This allows the host extensions to update their UI elements so that the host extensions and the host application present similarly styled UI elements. Additionally, the host extensions may update their UI elements so that the host extensions present similarly styled UI elements with the document being presented by or edited in the host application. Additional details regarding this process will be provided below with regard to FIGS. 1-8.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computer-implemented method, computer-readable storage medium, and a system for propagating theme change events from a host application to a host extension will be presented.

FIG. 1 is a block diagram providing an overview of the operation of various components presented herein. According to various embodiments, a system includes a host application 102, with one or more documents 108 presented by the host application 102. For example, and without limitation, the host application 102 might be a word processing application and the documents 108 might be word processing documents. Similarly, the host application 102 might be a presentation application and the documents 108 might be presentations. The host application 102 might also be a Web-based application that provides functionality for viewing and/or editing a document 108 and that includes the functionality disclosed herein. The host application might also be a spreadsheet application, an email application, a web-based document management and collaboration application, or another type of application that utilizes themes and allows for the use of extensions. In this regard, it should be appreciated that the embodiments disclosed herein are not limited to use with a particular type of host application 102 or documents 108.

In one embodiment, a theme definition 104 defines theme information for use by both the host application 102 and a document 108. The theme definition 104 defines a visual style for use by the host application 102 in presenting its UI and may also define a visual style for presenting elements of a document 108. In this regard, the theme definition 104 might define colors, font names, font styles, and other visual elements. By way of example, and not limitation, the defined colors may include background colors, foreground colors and font colors. The combination of these visual elements may be referred to herein as a "theme."

In some embodiments, the theme definition 104 defines both an application level theme 114 and a document level theme 110. The application level theme 114 defines a theme for UI elements presented by the host application 102. For example, the application level theme 114 might define how a host UI 116 containing UI elements for controlling the operation of the host application 102 is to be presented or the frame style of the application itself. The document level theme 110 defines a theme for use in presenting the contents of the document 108.

One or more host extensions 106 might also be provided that are configured or installed for use with the host application 102. The host extensions 106 may be utilized to extend the functionality provided by the host application 102. In order to provide this functionality, a host extension 106 may be configured to present a host extension UI 112. The host extension UI 112 may include UI elements for controlling the operation of the host extension 106.

When the host extension 106 begins execution, the host extension 106 may obtain the theme definition 104 currently exposed by the host application 102. The host extension 106 may utilize the theme definition 104 to present the host extension UI 112 consistent with the application level theme 114 and the document level theme 110. For example, and without limitation, the host extension 106 might utilize the document level theme 110 to show a consistent background color and font type to that of the host application 102. The host extension 106 might also utilize the document level theme 110 to present UI elements in a document 108. Additional details regarding this process will be provided below with reference to FIGS. 2-8.

Figure 2:
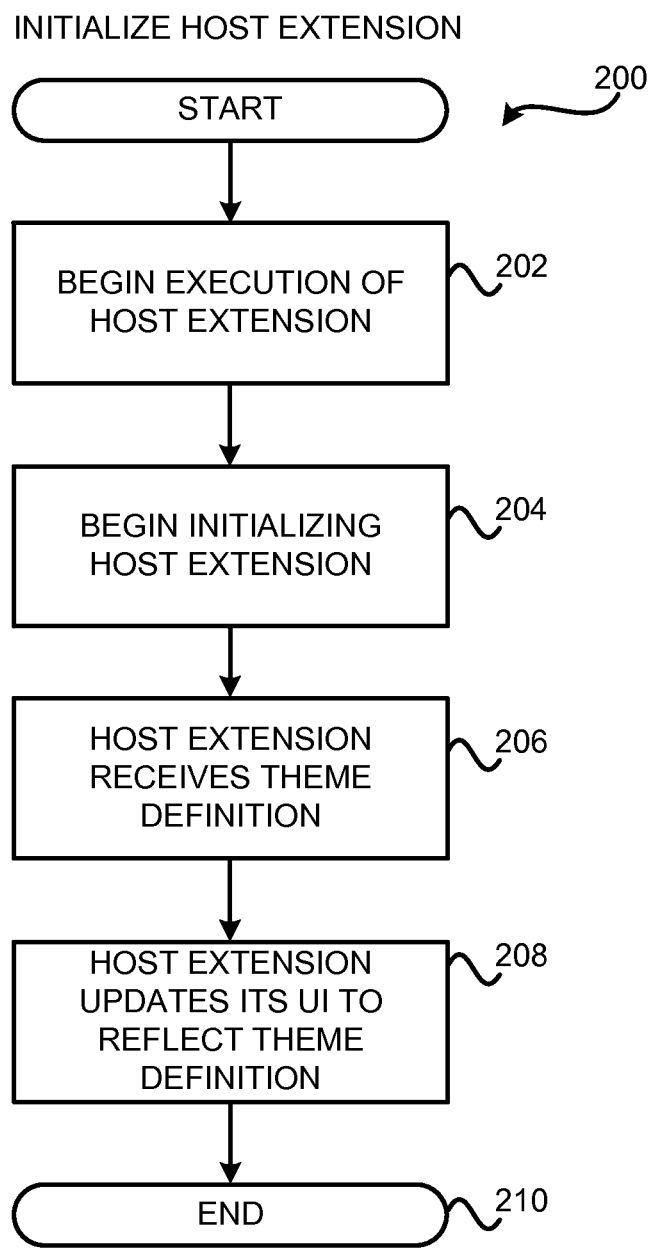
FIG. 2 is a flow diagram showing aspects of a method for initialization of a host extension, in accordance with some embodiments.

Turning now to FIG. 2, an illustrative routine 200 will be described that illustrates aspects of one mechanism disclosed herein for initializing a host extension 106, according to an illustrative embodiment. It should be understood that the operations described below with respect to FIG. 2, and the other figures, are not necessarily presented in any particular order and that performance of some or all of the operations in an alternative order is possible and is contemplated. The operations have been presented in the demonstrated order for ease of description and illustration. Operations may be added, omitted, and/or performed simultaneously or in a different order than described, without departing from the scope of the appended claims.

It also should be understood that the illustrated routine 200 can be ended at any time and need not be performed in its entirety. Some or all operations of the routine 200, and/or substantially equivalent operations, can be performed by execution of computer-readable instructions included on a computer-storage media, as defined herein. For purposes of the claims, the phrase "computer-readable storage medium" and variations thereof, does not include waves, signals, and/or other transitory and/or intangible communication media, per se. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

The routine 200 begins at operation 202, wherein the host extension 106 begins execution. As a precondition step, it is assumed that the host application 102 is active, and the host extension 106 either already existed in the document 108 or was inserted. From operation 202, the routine 200 proceeds to operation 204, where the host application 102 begins initializing the host extension 106. From operation 204, the routine 200 proceeds to operation 206, wherein the host extension 106 receives theming information contained in the theme definition 104 from the host application 102. As mentioned previously, the theme definition 104 may contain both an application level theme 114 and a document level theme 110.

The theme definition 104 is defined in some embodiments using metadata, such as a Cascading Style Sheet ("CSS"). The host application 102 may provide the CSS to the host extension 106 during initialization. Other types of metadata might also be utilized to provide the theme definition 104 to the host extension 106 during initialization, such as Extensible Markup Language ("XML"). The metadata may be updated to reflect changes to the application level them 114 and/or the document level theme 110.

Alternatively, the host application 102 might provide the theme definition 104 to the host extension 106 via an application programming interface ("API"). For example, and without limitation, the host application 102 might expose an API through which host extensions 106 can subscribe to receive notifications of certain types of events, such as events that result in a change to the theme definition 104. In this way, the host extensions 106 may receive the theme definition 104 at initialization time and also receiving a notification each time the theme definition 104 is changed. Other mechanisms might also be utilized to provide the theme definition 104 to the host extensions 106.

From operation 206, the routine 200 proceeds to operation 208. At operation 208 the host extension 106 updates the host extension UI 112 to reflect the theme definition 104. For example, and without limitation, the host extension 106 might update UI elements for controlling the operation of the host extension 106 itself. The host extension 106 might also update the presentation of UI elements contained in a document 108 based upon the theme definition 104.

By way of example, and not limitation, a host extension 106 may be configured to display a table in a document 108. The table may initially have different fonts, font colors and font sizes from the remainder of the document 108. When the host extension 106 receives the theme definition 104, the host extension UI 112 can utilize the document level theme 110 contained therein to update the fonts, font colors, font sizes and other stylistic elements in the table. By utilizing the document level theme 110 in this manner, document content presented by the host extension 106 will appear consistent with the remainder of the document 108. In a similar manner, the host extension 106 might utilize the application level theme 114 to present UI elements that are visually consistent with UI elements presented by the host application 102. Additionally, the host extension 106 may be shared among different host applications 102. For example, and without limitation, the host extension 106 may provide a chart or other type of graphic that is inserted into a document created by a word processing application and that may also be utilized within a presentation created a presentation application. From operation 208, the routine 200 proceeds to operation 210, where it ends.

Figure 3:
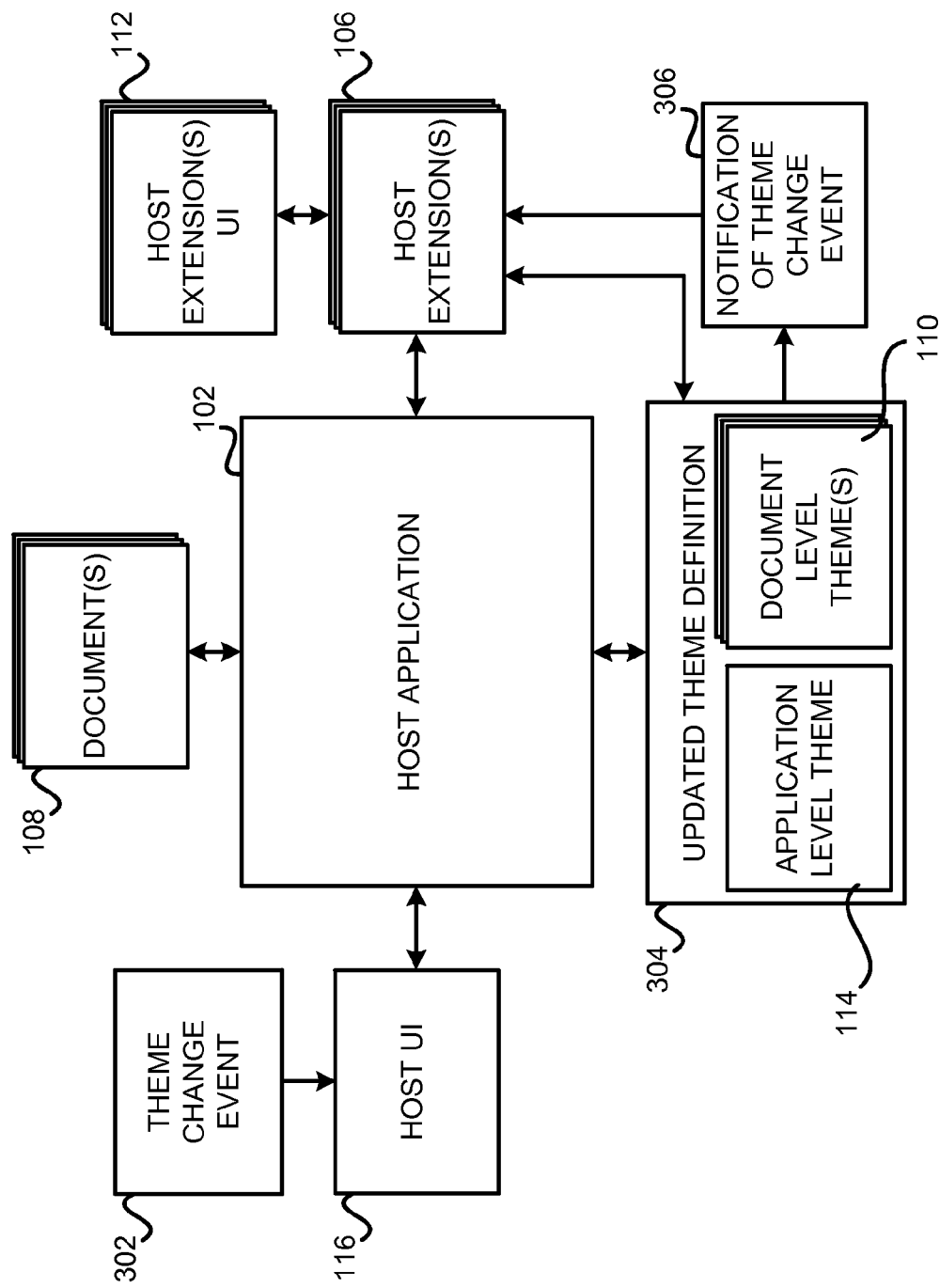
FIG. 3 is a block diagram providing an overview of aspects of the embodiments presented herein for processing a theme change event.

Turning now to FIG. 3, additional details will be provided regarding one mechanism disclosed herein for notifying host extensions 106 when a theme change event 302 occurs. As shown in FIG. 3, a theme change event 302 may occur. The theme change event 302 may include a change to the application level theme 114, the document level theme 110 or both the application level theme 114 and the document level theme 110. The theme change event 302 may occur as a result of general user interactions with the host application 102. For example, and without limitation, the theme change event 302 may occur when a user changes the current application level theme 114 and/or the document level theme 110. Additionally, the theme change event 302 may occur in response to a user selecting a new application level theme 114 and/or a new document level theme 110. The application level theme 114 and the document level theme 110 may be a pre-defined theme, a user-defined theme or a third-party created theme.

The theme change event 302 might also occur in response to changing slides in a presentation or slide show that utilizes different themes on each page, or using an undo commando to undo a previous theme change. Other events might also change the current application level theme 114 or document level theme 110 and, therefore, cause a theme change event 302 to occur. The theme change event 302 might also occur when a user changes between different components or features within the host application 102. For example, a calendar and an email message in a personal information manager application, such as the OUTLOOK personal information manager from MICROSOFT CORPORATION, may have different themes. Changing from an email component to the calendar component within such a host application 102 may generate a theme change event 302.

The theme definition 104 is updated in response to a theme change event 302. Additionally, the host application 102 provides a notification 306 of the theme change event 302 to the host extensions 106. In response to receiving a notification 306 of a theme change event 302, the host extension 106 may obtain the updated theme definition 304. The host extension 106 may then utilize the updated theme definition 304 to update the host extension UI 112 to reflect the updated theme definition 304. By making this change, the host extension UI 112 will continue to appear consistent with the UI provided by the host application 102 and the contents of the document 108.

Figure 4:
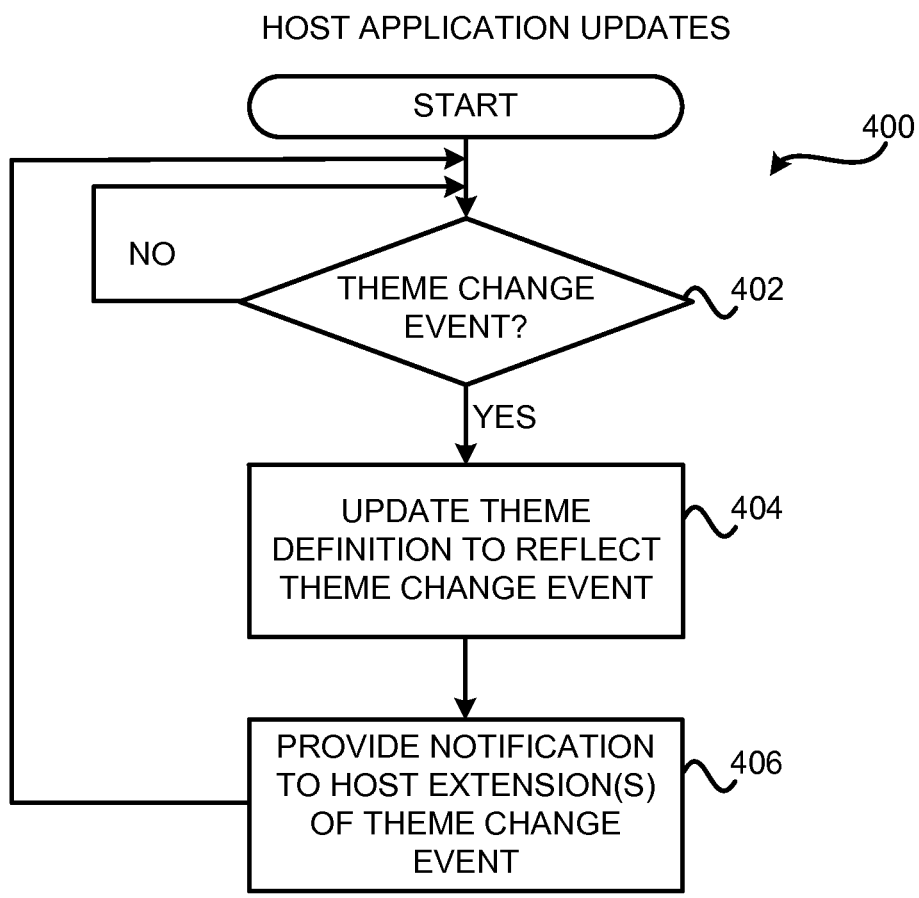
FIG. 4 is a flow diagram showing aspects of a method for updating a theme definition in response to the occurrence of a theme change event, in accordance with some embodiments.

Turning now to FIG. 4, aspects of a routine 400 for updating the theme definition 104 in response to a theme change event 302 will be described. The routine 400 begins at operation 402, where the host application 102 determines if a theme change event 302 has occurred. If a theme change event 302 has not occurred the routine 400 proceeds back to operation 402 where another such determination may be made.

If a theme change event 302 occurs at operation 402, the routine 400 proceeds to operation 404, where the host application 102 updates the theme definition 104 to reflect the theme change event 302. The theme definition 104 is updated if the theme change event 302 affects the application level theme 114, the document level theme 110 or both the application level theme 114 and the document level theme 110.

From operation 404, the routine 400 proceeds to operation 406, where the host application 102 provides a notification 306 of the theme change event 302 to the host extensions 106. As mentioned previously, the theme definition 104 may be sent to the host extension 106 via a CSS file or through the use of an API. Similarly, the updated theme definition 304 might also be sent to the host extension 106 by updating the contents of a CSS file or through the use of an appropriate API. Other mechanisms might also be utilized in order to provide the updated theme definition 304 to the host extensions 106. From operation 406, the routine 400 proceeds back to operation 402 where another determination may be made as to whether a theme change event 302 has occurred.

Figure 5:
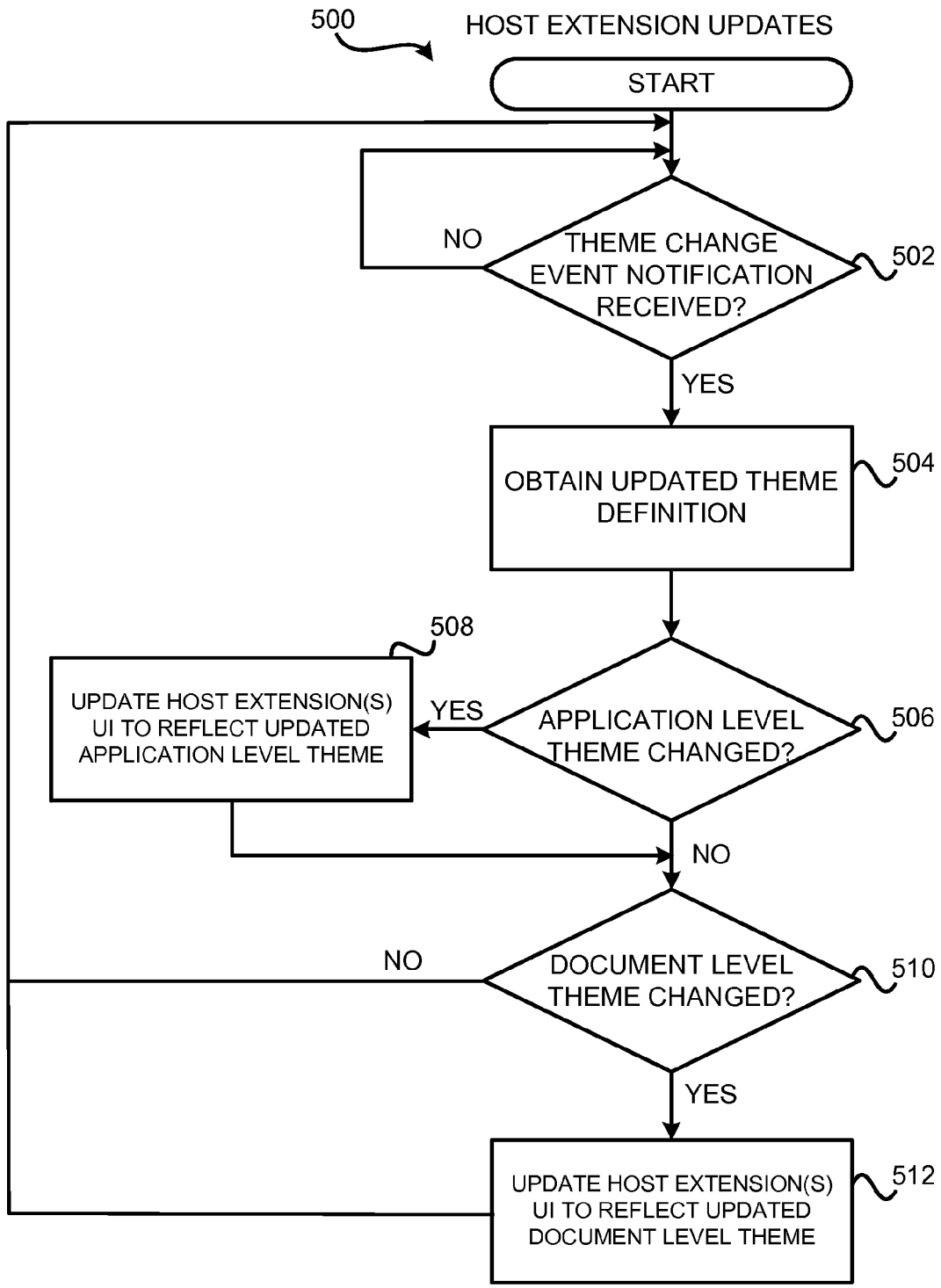
FIG. 5 is a flow diagram showing aspects of a method for updating a host extension UI to reflect an updated theme definition, in accordance with some embodiments.

Turning now to FIG. 5, aspects of a routine 500 for updating a host extension UI 112 to reflect an updated theme definition 304 will be provided. The routine 500 begins at operation 502, where the host extension 106 determines if a notification 306 of a theme change event 302 has been received. If a notification 306 of a theme change event 302 has not been received, the routine 500 proceeds back to operation 502 where another such determination may be made. If a notification 306 of a theme change event 302 has been received at operation 502, the routine 500 continues to operation 504.

At operation 504, the host extension 106 obtains the updated theme definition 304. The routine 500 then proceeds from operation 504 to operation 506, where the host extension 106 determines if the application level theme 114 has changed. If the application level theme 114 has changed, the routine 500 proceeds to operation 508.

At operation 508, the host extension 106 updates the host extension UI 112 to reflect the updated application level theme 114. For example, the host extension 106 might utilize the updated application level theme 114 to modify the display of UI elements for controlling the operation of the host extension 106. By making this change, the UI presented by the host extension 106 will continue to appear consistent with UI presented by the host application 102. From operation 508, the routine 500 proceeds to operation 510, described below.

If the application level theme 114 has not been changed at operation 506, the routine 500 proceeds to operation 510. At operation 510, the host extension 106 determines if the document level theme 110 has been changed. If the document level theme 110 has not changed, then routine 500 proceeds back to operation 502 where another determination may be made as to whether a notification 306 of a theme change event 302 has been received. If the document level theme 110 has been changed at operation 510, the routine 500 proceeds to operation 512.

At operation 512, the host extension 106 updates the host extension UI 112 to reflect the updated document level theme 110. For example, and without limitation, the host extension 106 may update the display of elements presented with a document 108 to reflect the updated document level theme 110. By making this change, document elements presented by the host application 102 will appear consistently with document elements presented by the host extension 106. From operation 512, the routine 500 proceeds back to operation 502, where another determination is made as to whether a notification 306 of a theme change event 302 has been received.

Figure 6:
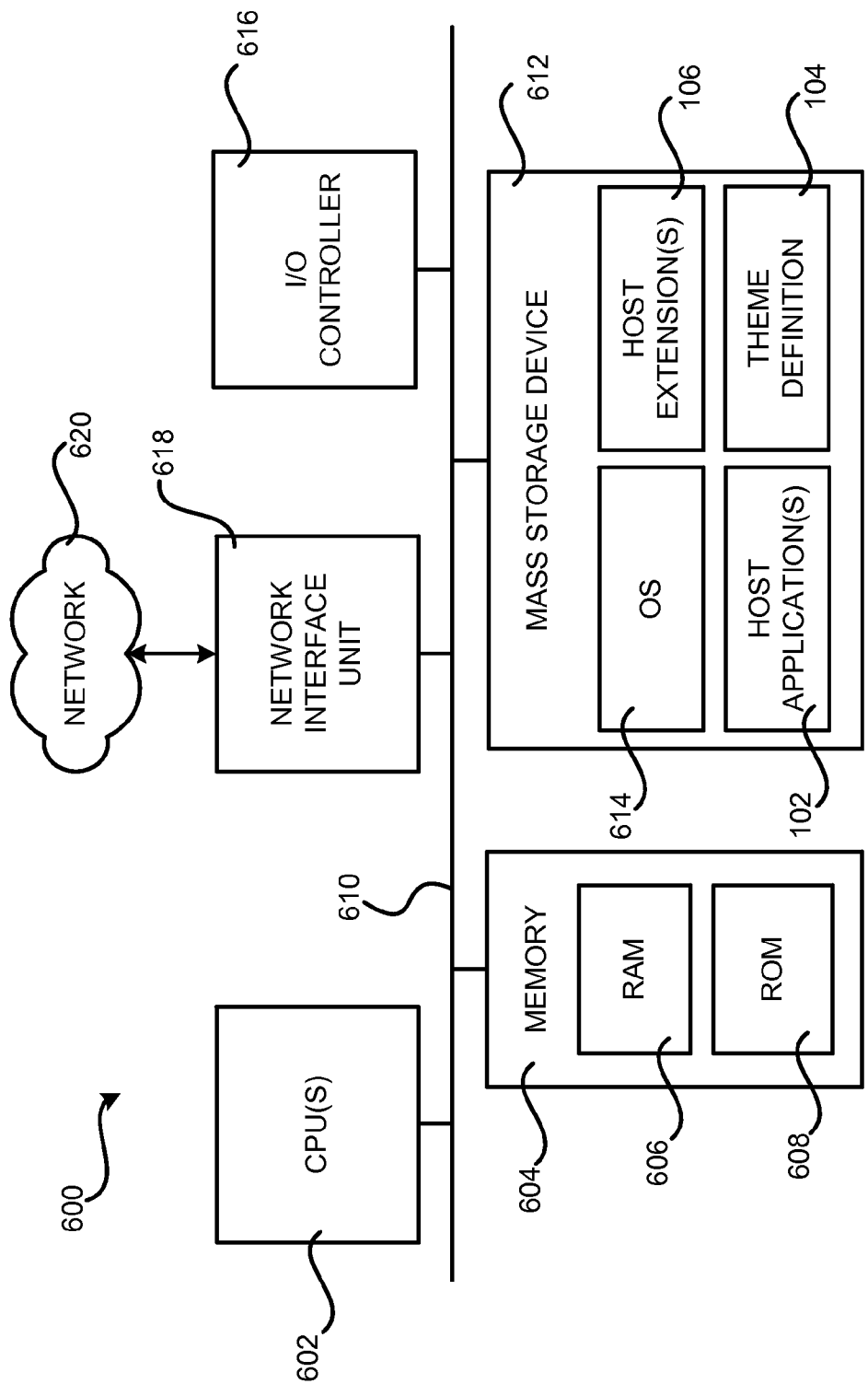
FIG. 6 is a computer architecture diagram showing an illustrative computer hardware and software architecture for a computing system capable of implementing aspects of the embodiments presented herein.

FIG. 6 shows an illustrative computer architecture 600 for a device capable of executing the software components described herein for propagating theming information from a host application 102 to one or more host extensions 106. The computer architecture 600 illustrated in FIG. 6 illustrates an architecture for a server computer, a mobile phone, a PDA, a smart phone, a desktop computer, a netbook computer, a tablet computer, and/or a laptop computer. The computer architecture 600 may be utilized to execute any aspects of the software components presented herein.

The computer architecture 600 illustrated in FIG. 6 includes a central processing unit 602 ("CPU"), a system memory 604, including a random access memory 606 ("RAM") and a read-only memory 608 ("ROM"), and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing the operating system 614 ("OS") and the host applications 102. The mass storage device 612 can also be utilized to store the host extensions 106 and the theme definition 104.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 600.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer-readable storage medium" and variations thereof, does not include waves, signals, and/or other transitory and/or intangible communication media, per se.

According to various embodiments, the computer architecture 600 may operate in a networked environment using logical connections to remote computers through a network such as the network 620. The computer architecture 600 may connect to the network 620 through a network interface unit 618 connected to the bus 610. It should be appreciated that the network interface unit 618 also may be utilized to connect to other types of networks and remote computer systems. The computer architecture 600 also may include an input/output controller 616 for receiving and processing input from a number of other devices, including a keyboard, mouse, or electronic stylus (not shown in FIG. 6). Similarly, the input/output controller 616 may provide output to a display screen, a printer, or other type of output device (also not shown in FIG. 6).

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

Figure 7:
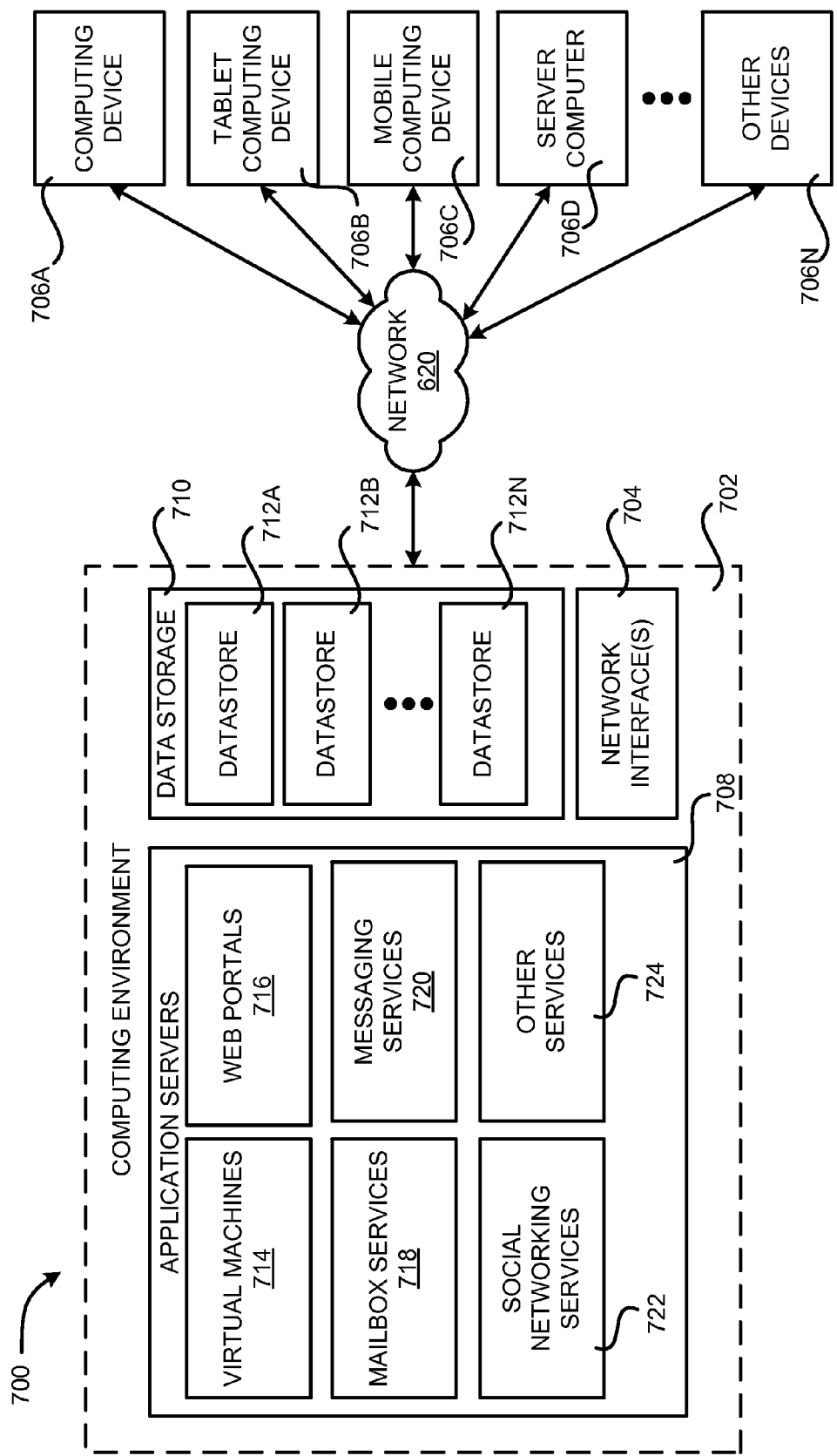
FIG. 7 is a diagram illustrating a distributed computing environment capable in which aspects of the embodiments presented herein may be implemented.

FIG. 7 shows an illustrative distributed computing environment 700 in which the software components described herein for propagating theming information from a host application 102 to a host extension 106 may be executed. According to various implementations, the distributed computing environment 700 includes a computing environment 702 operating on, in communication with, or as part of the network 620.

One or more client devices 706A-706N (hereinafter referred to collectively and/or generically as "clients 706") can communicate with the computing environment 702 via the network 620 and/or other connections (not illustrated in FIG. 7). In the illustrated embodiment, the clients 706 include a computing device 706A such as a laptop computer, a desktop computer, or other computing device, a slate or tablet computing device 706B, a mobile computing device 706C such as a mobile telephone, a smart phone, or other mobile computing device, a server computer 706D, and/or other devices 706N. It should be understood that any number of clients 706 can communicate with the computing environment 702. Two example computing architectures for the clients 706 are illustrated and described herein with reference to FIGS. 6 and 8. It should be understood that the illustrated clients 706 and computing architectures illustrated and described herein are illustrative, and should not be construed as being limited in any way.

In the illustrated embodiment, the computing environment 702 includes application servers 708, data storage 710, and one or more network interfaces 704. According to various implementations, the functionality of the application servers 708 can be provided by one or more server computers that are executing as part of, or in communication with, the network 620. The application servers 708 can host various services, virtual machines, portals, and/or other resources.

In the illustrated embodiment, the application servers 708 host one or more virtual machines 714 for hosting applications or other functionality. According to various implementations, the virtual machines 714 host one or more applications and/or software modules for providing the functionality described herein. It should be understood that this embodiment is illustrative, and should not be construed as being limiting in any way. The application servers 708 also host or provide access to one or more Web portals, link pages, Web sites, and/or other information ("Web portals") 716.

According to various implementations, the application servers 708 also include one or more mailbox services 718 and one or more messaging services 720. The mailbox services 718 can include electronic mail ("email") services. The mailbox services 718 also can include various personal information management ("PIM") services including, but not limited to, calendar services, contact management services, collaboration services, and/or other services. The messaging services 720 can include, but are not limited to, instant messaging services, chat services, forum services, and/or other communication services.

The application servers 708 also can include one or more social networking services 722. The social networking services 722 can include various social networking services including, but not limited to, services for sharing or posting status updates, instant messages, links, photos, videos, and/or other information; services for commenting or displaying interest in articles, products, blogs, or other resources; and/or other services. In some embodiments, the social networking services 722 are provided by or include the FACEBOOK social networking service, the LINKEDIN professional networking service, the MYSPACE social networking service, the FOURSQUARE geographic networking service, the YAMMER office colleague networking service, and the like.

In other embodiments, the social networking services 722 are provided by other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from MICROSOFT CORPORATION of Redmond, Wash. Other services are possible and are contemplated.

The social networking services 722 also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services 722 are not mentioned herein for the sake of brevity. As such, the above embodiments are illustrative, and should not be construed as being limited in any way.

As shown in FIG. 7, the application servers 708 also can host other services, applications, portals, and/or other resources ("other resources") 724. It thus can be appreciated that the computing environment 702 can provide integration of the concepts and technologies disclosed herein with various mailboxes, messaging, social networking, and/or other services or resources.

As mentioned above, the computing environment 702 can include data storage 710. According to various implementations, the functionality of the data storage 710 is provided by one or more databases operating on, or in communication with, the network 620. The functionality of the data storage 710 also can be provided by one or more server computers configured to host data for the computing environment 702. The data storage 710 can include, host, or provide one or more real or virtual datastores 712A-712N (hereinafter referred to collectively and/or generically as "datastores" 712"). The datastores 712 are configured to host data used or created by the application servers 708 and/or other data. Although not illustrated in FIG. 7, the datastores 712 also can host or store the host applications 102, the theme definition 104 and the host extensions 106 shown in FIG. 6, if desired.

The computing environment 702 can communicate with, or be accessed by, the network interfaces 704. The network interfaces 704 can include various types of network hardware and software for supporting communications between two or more computing devices including, but not limited to, the clients 706 and the application servers 708. It should be appreciated that the network interfaces 704 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the clients 706. It should be understood that the clients 706 can include real or virtual machines including, but not limited to, server computers, web servers, personal computers, mobile computing devices, smart phones, and/or other devices. As such, various embodiments of the concepts and technologies disclosed herein enable any device configured to access the distributed computing environment 700 to utilize the functionality described herein for propagating theming information from a host application 102 to a host extension 106.

Figure 8:
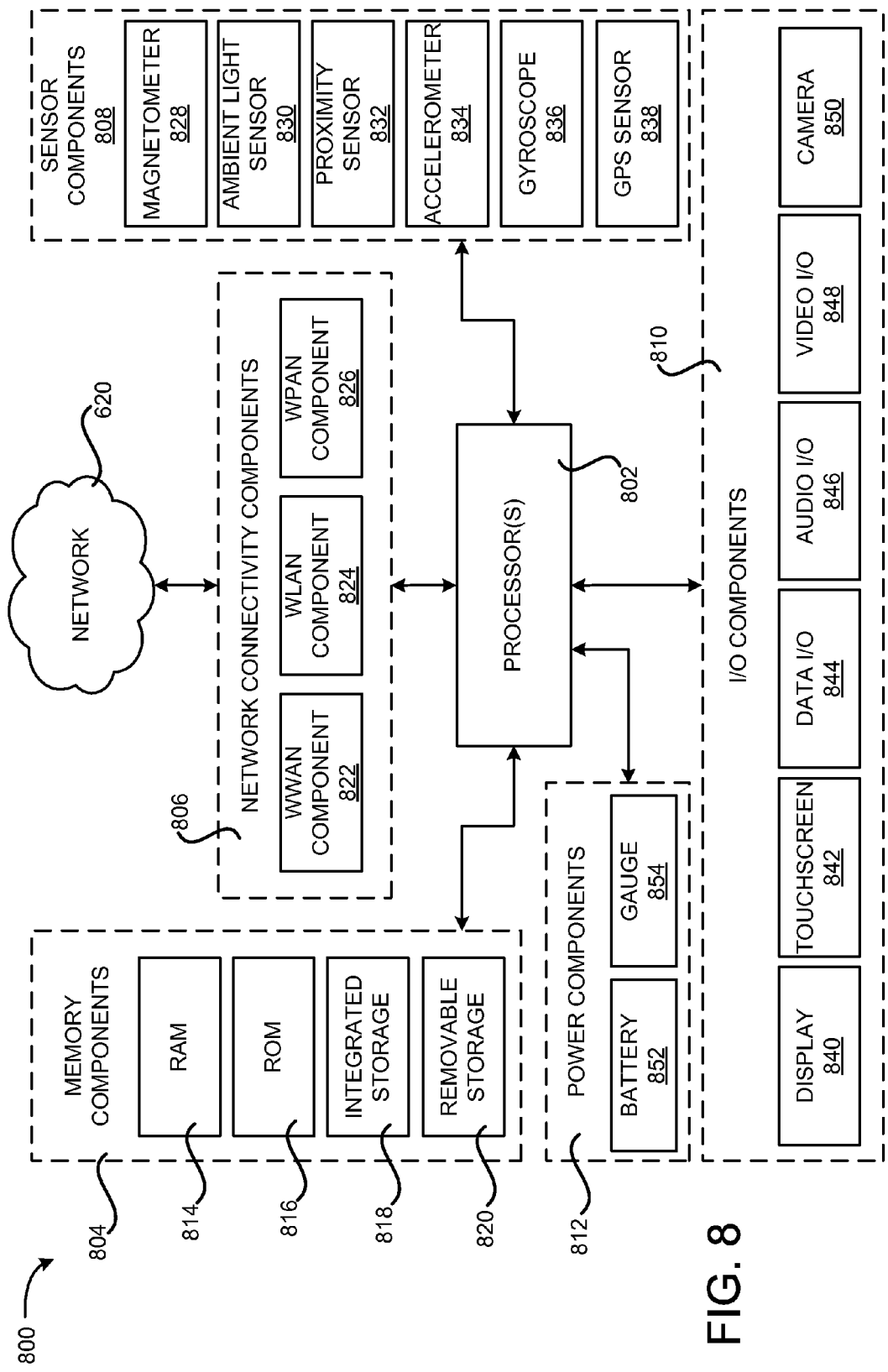
FIG. 8 is a computer architecture diagram illustrating a computing device architecture capable of implementing aspects of the embodiments presented herein.

Turning now to FIG. 8, an illustrative computing device architecture 800 is shown for a computing device that is capable of executing various software components described herein for propagating theming information from a host application 102 to a host extension 106. The computing device architecture 800 is applicable to computing devices that facilitate mobile computing due, in part, to form factor, wireless connectivity, and/or battery-powered operation. In some embodiments, the computing devices include, but are not limited to, mobile telephones, tablet devices, slate devices, portable video game devices, and the like. Moreover, the computing device architecture 800 is applicable to any of the clients 706 shown in FIG. 7. Furthermore, aspects of the computing device architecture 800 may be applicable to traditional desktop computers, portable computers (e.g., laptops, notebooks, ultra-portables, and netbooks), server computers, and other computer systems, such as described herein with reference to FIG. 6.

The computing device architecture 800 illustrated in FIG. 8 includes a processor 802, memory components 804, network connectivity components 806, sensor components 808, input/output components 810, and power components 812. In the illustrated embodiment, the processor 802 is in communication with the memory components 804, the network connectivity components 806, the sensor components 808, the input/output ("I/O") components 810, and the power components 812. Although no connections are shown between the individuals components illustrated in FIG. 8, the components can interact to carry out device functions. In some embodiments, the components are arranged so as to communicate via one or more busses (not shown).

The processor 802 includes one or more CPUs configured to process data, execute computer-executable instructions of one or more application programs, and communicate with other components of the computing device architecture 800 in order to perform various functionality described herein. The processor 802 may be utilized to execute aspects of the software components presented herein and, particularly, those that utilize, at least in part, theming information.

In some embodiments, the processor 802 includes a graphics processing unit ("GPU") configured to accelerate operations performed by the CPU, including, but not limited to, operations performed by executing general-purpose scientific and engineering computing applications, as well as graphics-intensive computing applications such as high resolution video (e.g., 720P, 1080P, and greater), video games, three-dimensional ("3D") modeling applications, and the like. In some embodiments, the processor 802 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some embodiments, the processor 802 is, or is included in, a system-on-chip ("SoC") along with one or more of the other components described herein below. For example, the SoC may include the processor 802, a GPU, one or more of the network connectivity components 806, and one or more of the sensor components 808. In some embodiments, the processor 802 is fabricated, in part, utilizing a package-on-package ("PoP") integrated circuit packaging technique. Moreover, the processor 802 may be a single core or multi-core processor.

The processor 802 may be created in accordance with an ARM architecture, available for license from ARM HOLDINGS of Cambridge, United Kingdom. Alternatively, the processor 802 may be created in accordance with an x86 architecture, such as is available from INTEL CORPORATION of Mountain View, Calif. and others. In some embodiments, the processor 802 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 804 include a RAM 814, a ROM 816, an integrated storage memory ("integrated storage") 818, and a removable storage memory ("removable storage") 820. In some embodiments, the RAM 814 or a portion thereof, the ROM 816 or a portion thereof, and/or some combination the RAM 814 and the ROM 816 is integrated in the processor 802. In some embodiments, the ROM 816 is configured to store a firmware, an operating system or a portion thereof (e.g., operating system kernel), and/or a bootloader to load an operating system kernel from the integrated storage 818 or the removable storage 820.

The integrated storage 818 can include a solid-state memory, a hard disk, or a combination of solid-state memory and a hard disk. The integrated storage 818 may be soldered or otherwise connected to a logic board upon which the processor 802 and other components described herein also may be connected. As such, the integrated storage 818 is integrated in the computing device. The integrated storage 818 is configured to store an operating system or portions thereof, application programs, data, and other software components described herein.

The removable storage 820 can include a solid-state memory, a hard disk, or a combination of solid-state memory and a hard disk. In some embodiments, the removable storage 820 is provided in lieu of the integrated storage 818. In other embodiments, the removable storage 820 is provided as additional optional storage. In some embodiments, the removable storage 820 is logically combined with the integrated storage 818 such that the total available storage is made available and shown to a user as a total combined capacity of the integrated storage 818 and the removable storage 820.

The removable storage 820 is configured to be inserted into a removable storage memory slot (not shown) or other mechanism by which the removable storage 820 is inserted and secured to facilitate a connection over which the removable storage 820 can communicate with other components of the computing device, such as the processor 802. The removable storage 820 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 804 can store an operating system. According to various embodiments, the operating system includes, but is not limited to, SYMBIAN OS from SYMBIAN LIMITED, WINDOWS MOBILE OS from MICROSOFT CORPORATION of Redmond, Wash., WINDOWS PHONE OS from MICROSOFT CORPORATION, WINDOWS from MICROSOFT CORPORATION, PALM WEBOS from HEWLETT-PACKARGD COMPANY of Palo Alto, Calif., BLACKBERRY OS from RESEARCH IN MOTION LIMITED of Waterloo, Ontario, Canada, IOS from APPLE, INC. of Cupertino, Calif., and ANDROID OS from GOOGLE, INC. of Mountain View, Calif. Other operating systems are contemplated.

The network connectivity components 806 include a wireless wide area network component ("WWAN component") 822, a wireless local area network component ("WLAN component") 824, and a wireless personal area network component ("WPAN component") 826. The network connectivity components 806 facilitate communications to and from a network 620, which may be a WWAN, a WLAN, or a WPAN. Although a single network 620 is illustrated, the network connectivity components 806 may facilitate simultaneous communication with multiple networks. For example, the network connectivity components 806 may facilitate simultaneous communications with multiple networks via one or more of a WWAN, a WLAN, or a WPAN.

The network 620 may be a WWAN, such as a mobile telecommunications network utilizing one or more mobile telecommunications technologies to provide voice and/or data services to a computing device utilizing the computing device architecture 800 via the WWAN component 822. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX"). Moreover, the network 620 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 620 may be configured to provide voice and/or data communications with any combination of the above technologies. The network 620 may be configured to or adapted to provide voice and/or data communications in accordance with future generation technologies.

In some embodiments, the WWAN component 822 is configured to provide dual-multi-mode connectivity to the network 620. For example, the WWAN component 822 may be configured to provide connectivity to the network 620, wherein the network 620 provides service via GSM and UMTS technologies, or via some other combination of technologies. Alternatively, multiple WWAN components 822 may be utilized to perform such functionality, and/or provide additional functionality to support other non-compatible technologies (i.e., incapable of being supported by a single WWAN component). The WWAN component 822 may facilitate similar connectivity to multiple networks (e.g., a UMTS network and an LTE network).

The network 620 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some embodiments, the WLAN is implemented utilizing one or more wireless WI-FI access points. In some embodiments, one or more of the wireless WI-FI access points are another computing device with connectivity to a WWAN that are functioning as a WI-FI hotspot. The WLAN component 824 is configured to connect to the network 620 via the WI-FI access points. Such connections may be secured via various encryption technologies including, but not limited, WI-FI Protected Access ("WPA"), WPA2, Wired Equivalent Privacy ("WEP"), and the like.

The network 620 may be a WPAN operating in accordance with Infrared Data Association ("IrDA"), BLUETOOTH, wireless Universal Serial Bus ("USB"), Z-Wave, ZIGBEE, or some other short-range wireless technology. In some embodiments, the WPAN component 826 is configured to facilitate communications with other devices, such as peripherals, computers, or other computing devices via the WPAN.

The sensor components 808 include a magnetometer 828, an ambient light sensor 830, a proximity sensor 832, an accelerometer 834, a gyroscope 836, and a Global Positioning System sensor ("GPS sensor") 838. It is contemplated that other sensors, such as, but not limited to, temperature sensors or shock detection sensors, also may be incorporated in the computing device architecture 800.

The magnetometer 828 is configured to measure the strength and direction of a magnetic field. In some embodiments the magnetometer 828 provides measurements to a compass application program stored within one of the memory components 804 in order to provide a user with accurate directions in a frame of reference including the cardinal directions, north, south, east, and west. Similar measurements may be provided to a navigation application program that includes a compass component. Other uses of measurements obtained by the magnetometer 828 are contemplated.

The ambient light sensor 830 is configured to measure ambient light. In some embodiments, the ambient light sensor 830 provides measurements to an application program stored within one the memory components 804 in order to automatically adjust the brightness of a display (described below) to compensate for low-light and high-light environments. Other uses of measurements obtained by the ambient light sensor 830 are contemplated.

The proximity sensor 832 is configured to detect the presence of an object or thing in proximity to the computing device without direct contact. In some embodiments, the proximity sensor 832 detects the presence of a user's body (e.g., the user's face) and provides this information to an application program stored within one of the memory components 804 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 832 are contemplated.

The accelerometer 834 is configured to measure proper acceleration. In some embodiments, output from the accelerometer 834 is used by an application program as an input mechanism to control some functionality of the application program. For example, the application program may be a video game in which a character, a portion thereof, or an object is moved or otherwise manipulated in response to input received via the accelerometer 834. In some embodiments, output from the accelerometer 834 is provided to an application program for use in switching between landscape and portrait modes, calculating coordinate acceleration, or detecting a fall. Other uses of the accelerometer 834 are contemplated.

The gyroscope 836 is configured to measure and maintain orientation. In some embodiments, output from the gyroscope 836 is used by an application program as an input mechanism to control some functionality of the application program. For example, the gyroscope 836 can be used for accurate recognition of movement within a 3D environment of a video game application or some other application. In some embodiments, an application program utilizes output from the gyroscope 836 and the accelerometer 834 to enhance control of some functionality of the application program. Other uses of the gyroscope 836 are contemplated.

The GPS sensor 838 is configured to receive signals from GPS satellites for use in calculating a location. The location calculated by the GPS sensor 838 may be used by any application program that requires or benefits from location information. For example, the location calculated by the GPS sensor 838 may be used with a navigation application program to provide directions from the location to a destination or directions from the destination to the location. Moreover, the GPS sensor 838 may be used to provide location information to an external location-based service, such as E911 service. The GPS sensor 838 may obtain location information generated via WI-FI, WIMAX, and/or cellular triangulation techniques utilizing one or more of the network connectivity components 806 to aid the GPS sensor 838 in obtaining a location fix. The GPS sensor 838 may also be used in Assisted GPS ("A-GPS") systems.

The I/O components 810 include a display 840, a touchscreen 842, a data I/O interface component ("data I/O") 844, an audio I/O interface component ("audio I/O") 846, a video I/O interface component ("video I/O") 848, and a camera 850. In some embodiments, the display 840 and the touchscreen 842 are combined. In some embodiments two or more of the data I/O component 844, the audio I/O component 846, and the video I/O component 848 are combined. The I/O components 810 may include discrete processors configured to support the various interface described below, or may include processing functionality built-in to the processor 802.

The display 840 is an output device configured to present information in a visual form. In particular, the display 840 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some embodiments, the display 840 is a liquid crystal display ("LCD") utilizing any active or passive matrix technology and any backlighting technology (if used). In some embodiments, the display 840 is an organic light emitting diode ("OLED") display. Other display types are contemplated.

The touchscreen 842 is an input device configured to detect the presence and location of a touch. The touchscreen 842 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen 842 is incorporated on top of the display 840 as a transparent layer to enable a user to use one or more touches to interact with objects or other information presented on the display 840. In other embodiments, the touchscreen 842 is a touch pad incorporated on a surface of the computing device that does not include the display 840. For example, the computing device may have a touchscreen incorporated on top of the display 840 and a touch pad on a surface opposite the display 840.

In some embodiments, the touchscreen 842 is a single-touch touchscreen. In other embodiments, the touchscreen 842 is a multi-touch touchscreen. In some embodiments, the touchscreen 842 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 842. As such, a developer may create gestures that are specific to a particular application program.

In some embodiments, the touchscreen 842 supports a tap gesture in which a user taps the touchscreen 842 once on an item presented on the display 840. The tap gesture may be used for various reasons including, but not limited to, opening or launching whatever the user taps. In some embodiments, the touchscreen 842 supports a double tap gesture in which a user taps the touchscreen 842 twice on an item presented on the display 840. The double tap gesture may be used for various reasons including, but not limited to, zooming in or zooming out in stages. In some embodiments, the touchscreen 842 supports a tap and hold gesture in which a user taps the touchscreen 842 and maintains contact for at least a pre-defined time. The tap and hold gesture may be used for various reasons including, but not limited to, opening a context-specific menu.

Although the above gestures have been described with reference to the use one or more fingers for performing the gestures, other appendages such as toes or objects such as styluses may be used to interact with the touchscreen 842. As such, the above gestures should be understood as being illustrative and should not be construed as being limiting in any way.

The data I/O interface component 844 is configured to facilitate input of data to the computing device and output of data from the computing device. In some embodiments, the data I/O interface component 844 includes a connector configured to provide wired connectivity between the computing device and a computer system, for example, for synchronization operation purposes. The connector may be a proprietary connector or a standardized connector such as USB, micro-USB, mini-USB, or the like. In some embodiments, the connector is a dock connector for docking the computing device with another device such as a docking station, audio device (e.g., a digital music player), or video device.

The audio I/O interface component 846 is configured to provide audio input and/or output capabilities to the computing device. In some embodiments, the audio I/O interface component 846 includes a microphone configured to collect audio signals. In some embodiments, the audio I/O interface component 846 includes a headphone jack configured to provide connectivity for headphones or other external speakers. In some embodiments, the audio interface component 846 includes a speaker for the output of audio signals. In some embodiments, the audio I/O interface component 846 includes an optical audio cable out.

The video I/O interface component 848 is configured to provide video input and/or output capabilities to the computing device. In some embodiments, the video I/O interface component 848 includes a video connector configured to receive video as input from another device (e.g., a video media player such as a DVD or BLURAY player) or send video as output to another device (e.g., a monitor, a television, or some other external display). In some embodiments, the video I/O interface component 848 includes a High-Definition Multimedia Interface ("HDMI"), mini-HDMI, micro-HDMI, DisplayPort, or proprietary connector to input/output video content. In some embodiments, the video I/O interface component 848 or portions thereof is combined with the audio I/O interface component 846 or portions thereof.

The camera 850 can be configured to capture still images and/or video. The camera 850 may utilize a charge coupled device ("CCD") or a complementary metal oxide semiconductor ("CMOS") image sensor to capture images. In some embodiments, the camera 850 includes a flash to aid in taking pictures in low-light environments. Settings for the camera 850 may be implemented as hardware or software buttons.

Although not illustrated, one or more hardware buttons may also be included in the computing device architecture 800. The hardware buttons may be used for controlling some operational aspect of the computing device. The hardware buttons may be dedicated buttons or multi-use buttons. The hardware buttons may be mechanical or sensor-based.

The illustrated power components 812 include one or more batteries 852, which can be connected to a battery gauge 854. The batteries 852 may be rechargeable or disposable. Rechargeable battery types include, but are not limited to, lithium polymer, lithium ion, nickel cadmium, and nickel metal hydride. Each of the batteries 852 may be made of one or more cells.

The battery gauge 854 can be configured to measure battery parameters such as current, voltage, and temperature. In some embodiments, the battery gauge 854 is configured to measure the effect of a battery's discharge rate, temperature, age and other factors to predict remaining life within a certain percentage of error. In some embodiments, the battery gauge 854 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 812 may also include a power connector, which may be combined with one or more of the aforementioned I/O components 810. The power components 812 may interface with an external power system or charging equipment via a power I/O component (not shown).

Based on the foregoing, it should be appreciated that technologies for propagating theming information from a host application to one or more host extensions have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for propagating theme change events from a host application to a host extension, the method comprising:
   providing a theme definition from the host application to the host extension, whereby the host extension utilizes the theme definition to update one or more user interface (UI) elements presented by the host extension;
   determining a theme change event associated with the host application has occurred, the theme change event including a user interaction with the host application;
   in response to determining the theme change event has occurred,
      updating the theme definition based upon the theme change event to create an updated theme definition,
      providing a notification of the theme change event from the host application to the host extension, and
      providing access to the updated theme definition from the host application to the host extension; and
   utilizing, by the host extension, the updated theme definition to update the one or more UI elements presented by the host extension.

2. The computer-implemented method of claim 1, wherein the theme definition comprises an application level theme defining a theme for one or more UI elements provided by the host application.

3. The computer-implemented method of claim 2, wherein the one or more UI elements presented by the host extension comprise UI elements presented by the host extension in the host application.

4. The computer-implemented method of claim 1, wherein the theme definition comprises a document level theme defining a theme for one or more UI elements defined by document content provided by a document from the host application.

5. The computer-implemented method of claim 4, wherein the one or more UI elements presented by the host extension comprise UI elements defined by the document content.

6. The computer-implemented method of claim 1, wherein the theme definition is defined utilizing metadata.

7. The computer-implemented method of claim 1, wherein the notification of the theme change event and the theme definition is provided to the host extension by way of an application programming interface (API).

8. The computer-implemented method of claim 1, wherein the theme change event comprises one or more of an undo command, a slide change operation, and receiving a selection of a new theme.

9. The computer-implemented method of claim 1, wherein the host application comprises one of a word processing program, a spreadsheet program, an email client program, a personal information manager (PIM) program, and a presentation program.

10. The computer-implemented method of claim 1, wherein the host application comprises a web-based document management and collaboration application.

11. A computer-readable storage medium, having computer-executable instructions stored thereupon which, when executed cause a computer to:
   provide a theme definition from a host application to a host extension, whereby the host extension utilizes the theme definition to update one or more user interface (UI) elements presented by the host extension;
   subscribe the host extension to receive a notification as a result of a theme change event;

determine the theme change event associated with the host application has occurred;

in response to determining the theme change event has occurred, update the theme definition based upon the theme change event to create an updated theme definition, and provide the notification of the theme change event from the host application to the host extension; and utilize, by the host extension, the updated theme definition to update the one or more UI elements presented by the host extension.

12. The computer-readable storage medium of claim 11, wherein the theme definition comprises an application level theme defining a theme for a plurality of UI elements provided by the host application.

13. The computer-readable storage medium of claim 12, wherein the one or more UI elements presented by the host extension comprise UI elements in a UI presented by the host application.

14. The computer-readable storage medium of claim 12, wherein the theme definition further comprises a document level theme defining a theme for one or more UI elements provided by document content.

15. The computer-readable storage medium of claim 14, wherein the one or more UI elements presented by the host extension comprise UI elements defined by the document content.

16. The computer-readable storage medium of claim 11, wherein the theme change event comprises one or more of an undo command, a slide change operation, and receiving a selection of a new theme.

17. The computer-readable storage medium of claim 11, wherein the host application comprises one of a word processing program, a spreadsheet program, an email client program, a PIM program, and a presentation program.

18. An apparatus for propagating theme change events from a host application to a host extension, the apparatus comprising:

a processor;

a memory communicatively coupled to the processor; and a host application which executes in the processor from the memory and which, when executed by the processor, causes the apparatus to:

provide a theme definition comprising an application level theme defining a theme for a plurality of user interface (UI) elements provided by the host application and a document level theme defining a theme for a plurality of UI elements provided by a document from the host application to the host extension whereby the host extension utilizes the theme definition to update one or more UI elements presented by the host extension to make the one or more UI elements presented by the host extension look consistent with the host application and the document;

determine a theme change event associated with the host application has occurred, the theme change event including a user interaction with the host application;

in response to determining the theme change event has occurred, update the theme definition based upon the theme change event to create an updated theme definition, provide a notification of the theme change event from the host application to the host extension, and provide access to the updated theme definition from the host application to the host extension and utilize, by the host extension, the updated theme definition to update the one or more UI elements presented by the host extension to make the one or more UI elements presented by the host extension look consistent with the host application and the document.

19. The apparatus of claim 18, wherein the one or more UI elements presented by the host extension comprise UI elements in the host application.

20. The apparatus of claim 18, wherein the one or more UI elements presented by the host extension comprise UI elements in the document.

* * * * *